(12) United States Patent
Steinlechner et al.

(10) Patent No.: US 6,693,582 B2
(45) Date of Patent: Feb. 17, 2004

(54) RADAR DEVICE AND METHOD FOR CODING A RADAR DEVICE

(75) Inventors: Siegbert Steinlechner, Leonberg (DE); Thomas Brosche, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/240,512

(22) PCT Filed: Dec. 22, 2001

(86) PCT No.: PCT/DE01/04913
§ 371 (c)(1),
(2), (4) Date: Mar. 26, 2003

(87) PCT Pub. No.: WO02/061454
PCT Pub. Date: Aug. 8, 2002

(65) Prior Publication Data
US 2003/0151542 A1 Aug. 14, 2003

(30) Foreign Application Priority Data
Jan. 31, 2001 (DE) .......................................... 101 04 022

(51) Int. Cl.⁷ ................................................. G01S 7/28
(52) U.S. Cl. ..................... 342/70; 342/130; 342/134; 342/135; 342/145; 342/201; 342/202
(58) Field of Search .............................. 342/70, 71, 72, 342/118, 127, 128, 130, 131, 134, 135, 145, 159, 189, 195, 201, 202, 203

(56) References Cited

U.S. PATENT DOCUMENTS

| | | | | |
|---|---|---|---|---|
| 4,075,698 A | * | 2/1978 | Lode | 702/72 |
| 4,285,048 A | * | 8/1981 | Casasent et al. | 708/816 |
| 4,952,939 A | | 8/1990 | Seed | 342/27 |
| 5,583,512 A | | 12/1996 | Mc Eligot | 342/189 |
| 5,636,123 A | * | 6/1997 | Rich et al. | 701/207 |
| 6,600,428 B1 | * | 7/2003 | O'Toole et al. | 340/825.36 |
| 6,606,054 B2 | * | 8/2003 | Okamura | 342/145 |
| 6,614,387 B1 | * | 9/2003 | Deadman | 342/70 |

FOREIGN PATENT DOCUMENTS

GB    1 587 357    4/1981

OTHER PUBLICATIONS

"Multiple pulse detection in distributed Rayleigh clutter", Foreman, T.L.; Wilson, S.G.; Radar Conference, 2000. The Record of the IEEE 2000 International, May 7–12, 2000 Ps: 637–642.*

"Multifrequency radar signals", Levanon, N.; Radar Conference, 2000. The Record of the IEEE 2000 International, May 7–12, 2000 Page(s): 683–688.*

"Doppler properties of polyphase pulse compression codes under different side–lobe reduction techniques", Yu Gen–miao; Wu Shun–jun; Luo Yong–jian; Radar, 2001 CIE International Conference on, Proceedings, Oct. 15–18, 2001 Ps: 524–528.*

* cited by examiner

Primary Examiner—John B. Sotomayor
(74) Attorney, Agent, or Firm—Kenyon & Kenyon

(57) ABSTRACT

A radar system having an arrangement for producing a code, an arrangement for modulating a transmission signal in a transmit branch, using the code, an arrangement for delaying the code, an arrangement for modulating a signal in a receive branch, using the delayed code, and an arrangement for mixing a reference signal with a receiving signal, the modulation of one of the signals being performed by an amplitude modulation (ASK; "amplitude shift keying") and the modulation of the other signal by a phase modulation (PSK; "phase shift keying"). Furthermore, a radar system is proposed in which blanking of phase transitions is provided. Also described are methods which may advantageously be carried out, using the radar systems described herein.

21 Claims, 15 Drawing Sheets

RADAR DEVICE AND METHOD FOR CODING A RADAR DEVICE

FIELD OF THE INVENTION

The present invention relates to a radar system having means for producing a code, means for modulating a transmission signal in a transmit branch using the code, means for delaying the code, means for modulating a signal in a receive branch using the delayed code, and means for mixing a reference signal with a receiving signal. The present invention also relates to a method for coding a radar system having the steps: generating a code, modulating a transmission signal in a transmit branch using the code, delaying the code, modulating a signal in a receive branch using the delayed code, and mixing a reference signal with a receiving signal.

BACKGROUND INFORMATION

There are numerous applications for radar systems in the most varied fields of technology. For instance, it is possible to install radar sensors in motor vehicles for very short range sensor systems.

In radar systems, in principle, electromagnetic waves are radiated by a transmission antenna. If these electromagnetic waves hit an obstacle, they are reflected, and after the reflection they are received by another or by the same antenna. Thereafter, the received signals are supplied to a signal processing and a signal evaluation.

For example, in motor vehicles, radar sensors are installed for measuring the distance to targets and/or the relative speed with respect to such destinations outside the motor vehicle. As targets, for example, preceding or parking motor vehicles come into consideration.

FIG. 1 shows a schematic representation of a radar system having a correlation receiver representing the state of the art. A transmitter 300 is induced by pulse generation 302 to radiate a transmission signal 306 from an antenna 304. The transmission signal 306 hits a target object 308, where it is reflected. The receiving signal 310 is received by antenna 312. This antenna 312 may be identical to antenna 304. After receiving signal 310 is received by antenna 312, this is communicated to receiver 314, and subsequently, via a unit 316 having a lowpass filter and an analog-digital converter, is supplied to a signal evaluation 318. The specialty about the correlation receiver is that receiver 314 receives a reference signal 320 from pulse generation 302. Receiving signals 310 received by receiver 314 are mixed in the receiver 314 with reference signal 320. Because of the correlation, conclusions may be drawn, for instance, as to the distance of a target object, on the basis of the temporal delay between the transmitting and receiving of the radar impulses.

In principle, it is desirable to separate interference signals, which may, for instance, originate from other transmission antennas, from portions of the signal reflected from the targets. Interferences are produced, for example, by other radar sensors, transmitters, consumers on the vehicle electrical system of the motor vehicle, cellular phones or by noise. Methods are already known which use an additional modulation of signals to separate interference signals from signal portions reflected from the targets. Likewise, it has already been proposed to use pseudo-noise coding (PN coding) for suppressing interference signals. By this coding it is supposed to be achieved that such interferences are minimized, in particular, the signal/noise (S/N) ratio in the output signal of the radar system being supposed to be increased. By such an increase in the S/N ratio it is made possible either to detect targets having a lower reflecting cross section or to decrease the pulse peak performance at constant S/N. The advantages of detecting targets having a lower reflecting cross section are, for instance, that a motor vehicle not only detects a preceding motor vehicle, but also, with great probability, pedestrians and bicyclists. The decrease in pulse peak performance has the result that lesser interferences from other systems, such as from directional radio systems, are brought about; in this connection, the decrease in pulse peak performance simplifies the approval of sensors by the appropriate regulating authorities.

SUMMARY OF THE INVENTION

According to a first specific embodiment, the present invention builds up on the radar system of the related art in that the modulation of one of the signals is carried out by an amplitude modulation (ASK; "Amplitude Shift Keying"), and the modulation of the other signal is carried out by a phase modulation (PSK; "Phase Shift Keying"). In this manner, an improvement in the S/N ratio is achieved. Thereby targets having a clearly lower reflection cross section may be detected, than used to be possible with radar systems of the related art having pure BPSK ("Binary Phase Shift Keying") or amplitude modulation. It is also possible to lower the pulse peak performance at a constant S/N ratio.

In the first specific embodiment it is particularly advantageous if the code is a pseudo-noise code (PN code). The use of PN codes for interference signal suppression has been discussed comprehensively in the literature, so that the present invention, in using PN codes, can be especially well implemented.

Preferably, the modulation of transmitting signals in the first specific embodiment is carried out by amplitude modulation, and the modulation of the signal in the receive branch is done by phase modulation. By using an amplitude modulation ASK in the transmit branch, this results in an improvement of the S/N ratio as opposed to using pure phase modulation PSK. The average transmitting power drops off by ca 3 dB as opposed to a phase modulation PSK in the transmit branch.

Likewise, it may be preferred in the first specific embodiment that the modulation of the transmitting signal is done by phase modulation, and that the modulation of the signal in the receive branch is done by amplitude modulation.

The first specific embodiment is advantageous when the means for mixing the reference signal with the received signal emit an output signal at a lowpass filter. The output signal is integrated using the lowpass filter, so that a suitable signal for further processing is available.

In the first specific embodiment, digital means for controlling the delay are preferably provided. Such digital means, such as a microcontroller or a digital signal processor are in a position to delay both the pulse repetition rate and the P/N code in a suitable manner, so that the signals in the receive branch experience the required correlation.

But in the first specific embodiment it may also be advantageous if circuitry means are provided for controlling the delay. Besides controlling the delay using digital means, it is also possible to install hardware for implementing the delay.

In the first specific embodiment, preferably, the means for producing and delaying an n-bit PN code are implemented as n-bit counters having combinatorial linkage of the counter outputs. An n-bit shift register makes several outputs available, the same PN code being made available at each output having in each case different temporal delays. Thus it is possible, in a simple way, to make available any desired code delays by a corresponding combinatorial linkage of the weighted outputs.

In the first specific embodiment it may also be of advantage if the receive branch is subdivided into several channels which use several PN codes for modulating, and if several lowpass filters are provided for further processing of the modulated signals. Because of this, the radar system may be broadened to include the evaluation of other signals transmitted by other radar sensors and modulated using other PN codes.

In the first specific embodiment it is particularly advantageous if means for blanking of phase transitions are provided. Since the transition of the phase relation in the actual setup does not occur instantaneously, errors occur after the integration of the signal. However, if the phase-modulated signal is blanked during the transition time between the various phase relations, these errors may be minimized. In the case of a combination, according to the present invention, of an amplitude modulation and a phase modulation, the bandwidth of the amplitude spectrum becomes greater. This improves the separability of different targets at equal pulse repetition rate, a smaller increment, however, being required for shifting the PN code. Alternatively, the pulse width may also be increased at almost unchanged high-sensitivity resolution, separability, increment and bandwidth.

In the first specific embodiment, a means for blanking phase transitions has a means for pulse formation and a switch, the switch being positioned in series with a means for phase modulation. The sequence of the means for phase modulation and the switch is a matter of choice. It is also conceivable that the blanking might be located between the receiving antenna and the mixer, or between the mixer and the subsequent lowpass filter. The phase modulation may also be located between the receiving antenna and the mixer. A suitable temporal window for the blanking is generated by the pulse formation.

According to a second specific embodiment, the present invention builds up on the radar system of the related art by having the modulation of at least one of the signals take place by a phase modulation (PSK; "Phase Shift Keying"), and by having means for blanking of phase transitions provided. Since the transition of the phase relation in the actual setup does not occur instantaneously, errors occur after the integration of the signal. However, if the phase-modulated signal is blanked during the transition time between the various phase relations, these errors may be minimized. In the case of a combination, according to the present invention, of an amplitude modulation and a phase modulation, the bandwidth of the amplitude spectrum becomes greater. This improves the separability of different targets at equal pulse repetition rate, a smaller increment, however, being required for shifting the PN code. Alternatively, the pulse width may also be increased at almost unchanged high-sensitivity resolution, separability, increment and bandwidth.

In the second specific embodiment of the radar system according to the present invention, it is particularly advantageous if the code is a pseudo-noise code (PN code). The use of PN codes for interference signal suppression has been discussed comprehensively in the literature, so that the present invention, in using PN codes, can be especially well implemented.

In the second specific embodiment, a means for blanking phase transitions preferably has a means for pulse formation and a switch, the switch being positioned in series with a means for phase modulation. The sequence of the means for phase modulation and the switch is optional. It is also conceivable that the blanking might be located between the receiving antenna and the mixer, or between the mixer and the subsequent lowpass filter. The phase modulation may also be located between the receiving antenna and the mixer. A suitable temporal window for the blanking is generated by the pulse formation.

Preferably, the modulation of transmitting signals in the second specific embodiment is carried out by amplitude modulation, and the modulation of the signal in the receive branch is done by phase modulation. By using an amplitude modulation ASK in the transmit branch, this results in an improvement of the S/N ratio as opposed to using pure phase modulation PSK. The average transmitting power drops off by ca 3 dB.

Likewise, it may be preferred in the second specific embodiment that the modulation of the transmitting signal is done by phase modulation, and that the modulation of the signal in the receive branch is done by amplitude modulation.

The second specific embodiment is advantageous when the means for mixing the reference signal with the received signal emit an output signal at a lowpass filter. The output signal is integrated using the lowpass filter, so that a suitable signal for further processing is available.

In the second specific embodiment, digital means for controlling the delay are preferably provided. Such digital means, such as a microcontroller or a digital signal processor are in a position to delay both the pulse repetition rate and the P/N code in a suitable manner, so that the signals in the receive branch experience the required correlation.

But in the second specific embodiment it may also be advantageous if circuitry means are provided for controlling the delay. Besides controlling the delay using digital means, it is also possible to install hardware for implementing the delay.

In the second specific embodiment, preferably, the means for producing and delaying an n-bit PN code are implemented as n-bit counters having combinatorial linkage of the counter outputs. An n-bit shift register makes several outputs available, the same PN code being made available at each output having in each case different temporal delays. Thus it is possible, in a simple way, to make available any desired code delays by a corresponding combinatorial linkage of the weighted outputs.

In the second specific embodiment it may also be of advantage if the receive branch is subdivided into several channels which use several PN codes for modulating, and if several lowpass filters are provided for further processing of the modulated signals. Because of this, the radar system may be broadened to include the evaluation of other signals transmitted by other radar sensors and modulated using other PN codes.

According to a first specific embodiment, the present invention builds up on the method of the related art in that the modulation of one of the signals is carried out by an amplitude modulation (ASK; "amplitude shift keying"), and the modulation of the other signal is carried out by a phase modulation (PSK; "Phase Shift Keying"). In this manner, an improvement in the S/N ratio is achieved. Thereby targets having a clearly lower reflection cross section may be detected, than used to be possible with radar systems of the related art having pure amplitude modulation. It is also possible to lower the pulse peak performance at a constant S/N ratio.

In the first specific embodiment of the method the code is preferably a pseudo-noise code (PN code). The use of PN codes for interference signal suppression has been discussed comprehensively in the literature, so that the present invention, in using PN codes, can be especially well implemented.

Preferably, the modulation of transmitting signals, in the first specific embodiment of the method, is carried out by amplitude modulation, and the modulation of the signal in the receive branch is done by phase modulation. By using an amplitude modulation ASK in the transmit branch, this results in an improvement of the S/N ratio as opposed to using pure phase modulation PSK. The average transmitting power drops off by ca 3 dB.

Likewise, it may be advantageous, in the first specific embodiment of the method, that the modulation of the transmitting signal is done by phase modulation, and that the modulation of the signal in the receive branch is done by amplitude modulation.

Advantageously, in the first specific embodiment of the method, the mixed signal is output to a lowpass filter. The output signal is integrated using the lowpass filter, so that a suitable signal for further processing is available.

It is of advantage if, in the first specific embodiment of the method, the delay is digitally controlled. Digital means, such as a microcontroller or a digital signal processor are in a position to delay both the pulse repetition rate and the P/N code in a suitable manner, so that the signals in the receive branch experience the required correlation.

However, it may also be useful if, in the first specific embodiment of the method, the delay is controlled by circuitry means. Besides controlling the delay using digital means, it is also possible to install hardware for implementing the delay.

In the first specific embodiment of the method, preferably, an n-bit PN code is generated and delayed by an n-bit counter having combinatorial linkage of the counter outputs. An n-bit shift register makes several outputs available, the same PN code being made available at each output having in each case different temporal delays. Thus it is possible, in a simple way, to make available any desired code delays by a corresponding combinatorial linkage of the weighted outputs.

The present invention may be of special advantage if, in the first specific embodiment of the method, the receive branch is subdivided into several channels which use several PN codes for modulating, and if the modulated signals are processed further by several lowpass filters. Because of this, the radar system may be broadened to include the evaluation of other signals transmitted by other radar sensors and modulated using other PN codes.

It is particularly advantageous, in the first specific embodiment of the method, if the phase transitions are blanked. Since the switching of the phase relation in the actual setup does not occur instantaneously, errors occur after the integration of the signal. However, if the phase-modulated signal is blanked during the transition time between the various phase relations, these errors may be minimized. In the case of a combination, according to the present invention, of an amplitude modulation and a phase modulation, the bandwidth of the amplitude spectrum becomes greater. This improves the separability of different targets at equal pulse repetition rate, a smaller increment, however, being required for shifting the PN code. Alternatively, the pulse width may also be increased at almost unchanged high-sensitivity resolution, separability, increment and bandwidth.

The first specific embodiment of the method is especially advantageous because a means for blanking phase transitions has a means for pulse formation and a switch, the switch being positioned in series with a means for modulating. The sequence of the means for phase modulation and the switch is optional. It is also conceivable that the blanking might be located between the receiving antenna and the mixer, or between the mixer and the subsequent lowpass filter. The phase modulation may also be located between the receiving antenna and the mixer. A suitable temporal window for the blanking is generated by the pulse formation.

According to a second specific embodiment, the present invention builds up on the method of the related art by having the modulation of at least one of the signals take place by a phase modulation (PSK; "Phase Shift Keying"), and by having means phase transitions blanked. Since the transition of the phase relation in the actual setup does not occur instantaneously, errors occur after the integration of the signal. However, if the phase-modulated signal is blanked during the transition time between the various phase relations, these errors may be minimized. In the case of a combination, according to the present invention, of an amplitude modulation and a phase modulation, the bandwidth of the amplitude spectrum becomes greater. This improves the separability of different targets at equal pulse repetition rate, a smaller increment, however, being required for shifting the PN code. Alternatively, the pulse width may also be increased at almost unchanged high-sensitivity resolution, separability, increment and bandwidth.

In the second specific embodiment of the system it is particularly advantageous if the code is a pseudo-noise code (PN code). The use of PN codes for interference signal suppression has been discussed comprehensively in the literature, so that the present invention, using as it does, PN codes, can be especially well implemented.

The second specific embodiment of the method is especially advantageous because a means for blanking phase transitions has a means for pulse formation and a switch, the switch being positioned in series with a means for modulating. The sequence of the means for phase modulation and the switch is optional. It is also conceivable that the blanking might be located between the receiving antenna and the mixer, or between the mixer and the subsequent lowpass filter. The phase modulation may also be located between the receiving antenna and the mixer. A suitable temporal window for the blanking is generated by the pulse formation.

Preferably, the modulation of transmitting signals, in the second specific embodiment of the method, is carried out by amplitude modulation, and the modulation of the signal in the receive branch is done by phase modulation. By using an amplitude modulation ASK in the transmit branch, this results in an improvement of the S/N ratio as opposed to using pure phase modulation PSK. The average transmitting power drops off by ca 3 dB.

Likewise, it may be advantageous, in the second specific embodiment of the method, that the modulation of the transmitting signal is done by phase modulation, and that the modulation of the signal in the receive branch is done by amplitude modulation.

Advantageously, in the second specific embodiment of the method, the mixed signal is output to a lowpass filter. The output signal of the mixer is integrated using the lowpass filter, so that a suitable signal for further processing is available.

It is of advantage if, in the second specific embodiment of the method, the delay is digitally controlled.

Digital means, such as a microcontroller or a digital signal processor are in a position to delay both the pulse repetition rate and the P/N code in a suitable manner, so that the signals in the receive branch experience the required correlation.

However, it may also be useful if, in the second specific embodiment of the method, the delay is controlled by circuitry means. Besides controlling the delay using digital means, it is also possible to install hardware for implementing the delay.

In the second specific embodiment of the method, preferably, an n-bit PN code is generated and delayed by an n-bit counter having combinatorial linkage of the counter outputs. An n-bit shift register makes several outputs available, the same PN code being made available at each output having in each case different temporal delays. Thus it is possible, in a simple way, to make available any desired code delays by a corresponding combinatorial linkage of the weighted outputs.

The second specific embodiment of the method may be of special advantage in that the receive branch is subdivided into several channels which use several PN codes for modulating, and in that the modulated signals are processed further by several lowpass filters. Because of this, the radar system may be broadened to include the evaluation of other signals transmitted by other radar sensors and modulated using other PN codes.

The present invention is based on the surprising realization that, by a combination of the amplitude modulation ASK and the phase modulation PSK an improvement of the S/N ratio as well as of the quality of target detection may be achieved. With the aid of blanking the phase transitions, errors caused by non-instantaneous switching of the phase transitions may be minimized. The use of discrete code shifting permits a linear blanking of the measured space. The accuracy of this blanking depends mainly on the accuracy of the pulse repetition rate, which can be set very accurately. The digital circuits for producing codes and for shifting codes, as well as the circuits and mixers may be well integrated, for example, in a "monolithic microwave integrated circuit" (MMIC).

DETAILED DESCRIPTION

Figure 1:
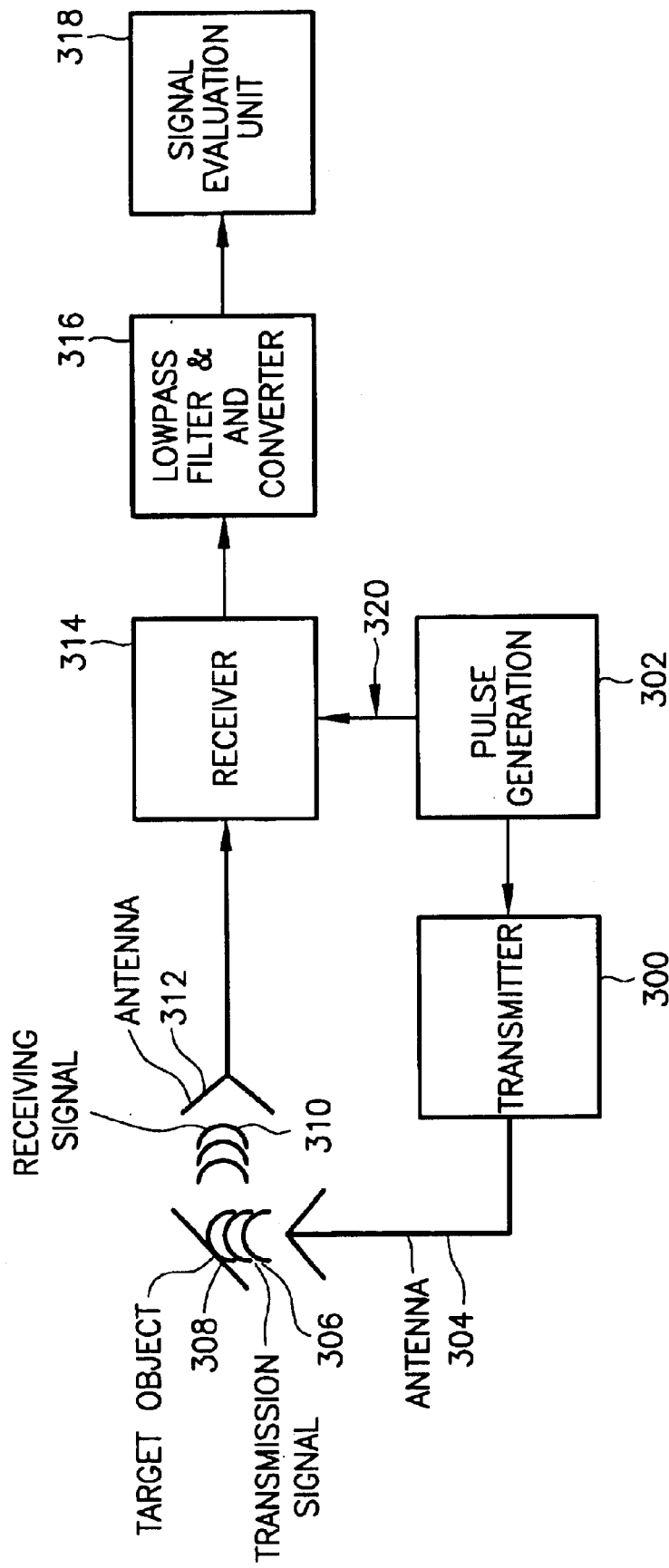
FIG. 1 shows a block diagram of a radar system of the related art.
Figure 2:
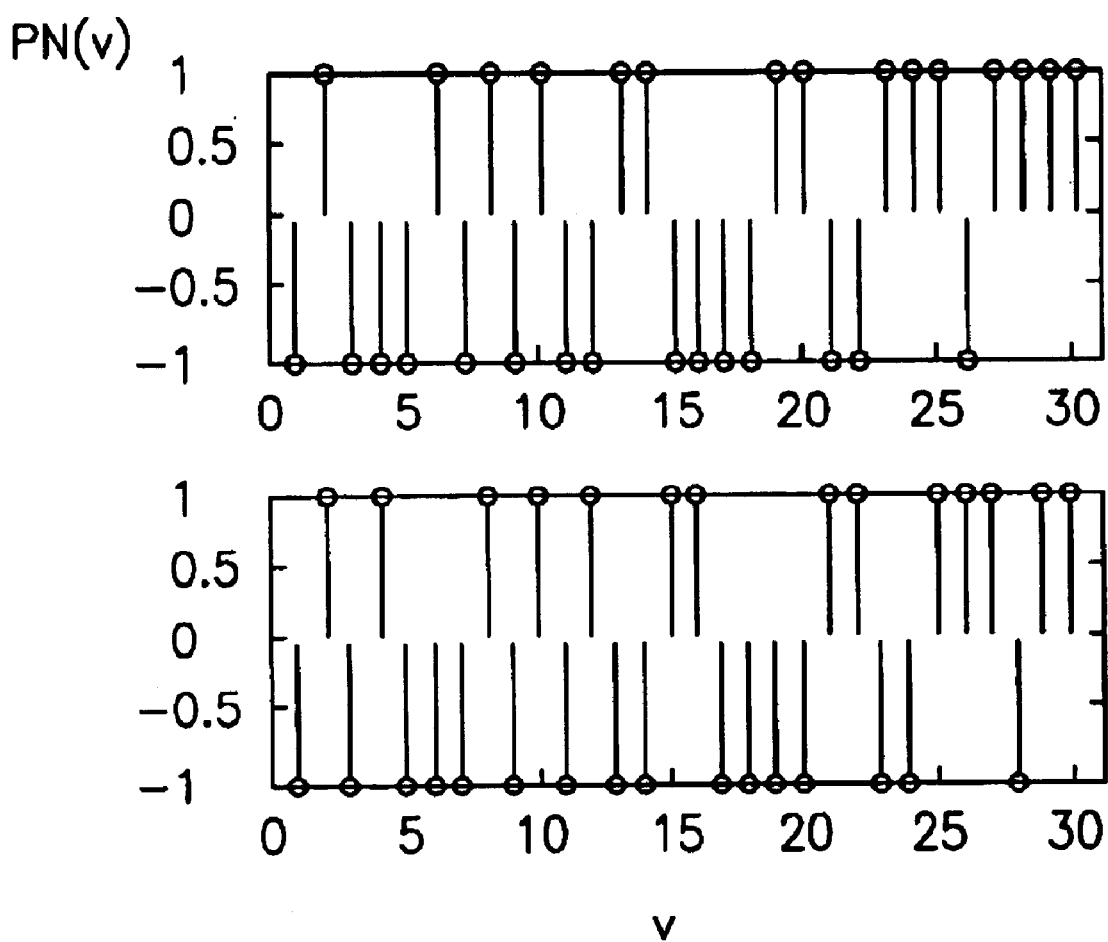
FIG. 2 shows segments from PN codes.

FIG. 2 shows segments of PN codes. In the upper part of FIG. 2, a PN code is shown as a function of parameter v. The lower part of FIG. 2 shows the same PN code with a shifting by v=2. Such PN codes and their shifting are used, within the framework of the present invention, for improving the S/N ratio and the ratio of useful signal to Doppler leakage signal. Basically, such an improvement is achieved by increasing the pulse repetition rate $f_{PW}$. However, the maximum pulse repetition rate is limited by the range of the radar:

$$f_{PW,\max} = \frac{c}{2R_{\max}}$$

with $f_{PW,max}$ being the maximum pulse repetition rate, c being the speed of light, $R_{max}$ being the range of the radar.

Targets at distances beyond $R_{max}$ are not detected. If the pulse repetition rate is increased, the measurement for target distances between $C/(2f_{PW})$ and $R_{max}$ is no longer definite. Within the framework of the present invention, however, one successfully achieves the S/N ratio by increasing the pulse repetition rate, because by using a PN coding, the pulse repetition rate may be increased without impairing the definite nature of the distance measurement. The reason for the improvement of the S/N ratio by increasing the pulse repetition rate is that an integration is made in the receiving signal over a larger number of pulses at an unchanged transmission function of the lowpass filter used. If the pulse repetition rate is raised, for instance, by a factor of m, the result by coherent integration is an S/N ratio increased by m. Accordingly, if the S/N ratio before increasing the pulse repetition rate is $(S/N)_n$, then, after increasing the pulse repetition rate, it is $m(S/N)_n$. However, if the original S/N ratio $(S/N)_n$ is sufficient in the integration of n pulses, the pulse peak performance $P_t$ may also be reduced while maintaining the S/N ratio at increased pulse repetition rate $f_{PW}$, $P_t$ being proportional to the reciprocal value of the pulse repetition rate. The upper part of FIG. 2 shows a segment of an 8-bit PN code selected as an example. If the code used has a suitable autocorrelation function (AKF), this makes it possible to increase the single-valuedness range of the distance measurement by signal coding.

Figure 3:
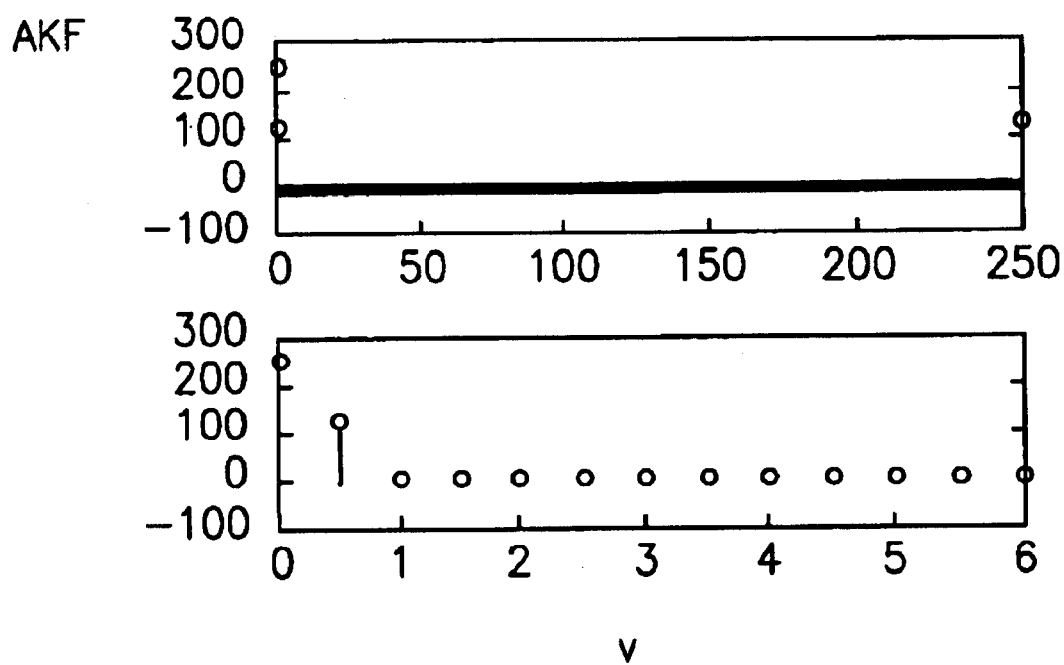
FIG. 3 shows an autocorrelation function of a PN code over various value ranges.

In FIG. 3 the relationships with respect to the autocorrelation function are explained in more detail. The upper part of FIG. 3 shows the autocorrelation function of an 8-bit PN code over a range of values from v=1 to v=255. Basically, the autocorrelation function of the PN code represents the result after multiplying the PN code by itself and subsequent summation as a function of shifting of the code by v pulses. The lower part of FIG. 3 shows a segment of the autocorrelation function of an 8-bit PN code, selected as an example, over a shifting by 0 to 6 pulses. Now, if between the receiving signal and a reference signal a relative shifting of 0 seconds is set, this yields the maximum value of the autocorrelation function for an 8-bit PN code, which amounts to $2^8-1=255$. If the value of the shifting is increased, the value of the autocorrelation function is reduced. In the example shown in FIG. 3, beginning at a shifting of $v \geq 1$, the result is $-1$. This clearly determined maximum of the autocorrelation function of a selected PN code at $v=0$ makes possible an exact measurement of the temporal delay of the received signal, and thus a definite determination of the target distance.

At an increment of the shifting of $\Delta v \leq 0.5$ one obtains a sufficient resolution of the autocorrelation function for an interpolation of the maximum. On account of the periodicity of the autocorrelation function, the single-valuedness range of this code extends from $v=0$ to $v_{max}=N-1$. As a function of the pulse frequency with which the individual chips are modulated onto the radar signal, one may assign a spatial extension to the "peak" of the autocorrelation function. For a code having a frame length (period) of N chips and a chip pulse frequency or pulse repetition rate $f_{PW}$, the result is a spatial single-valuedness range extending from 0 to $R_{ein}$, given by $$R_{ein} = \frac{(N-1)c}{2f_{PW}}$$

The condition $$R_{ein} \geq R_{max}$$

applies to the single-valuedness range. Otherwise there would be obtained an ambiguous measured value of $$\hat{r}=r-nR_{ein}$$

for the target distances, which lie between $R_{ein}$ and $R_{max}$, with $n=0, 1, \ldots$ and $\hat{r} \geq 0$ In that case, for the monitoring of the range, instrumented for the radar sensor, of 0 to $R_{inst}$, a maximum code shifting of $$v_{inst} = \frac{2R_{inst}f_{PW}}{c}$$

pulses would then be required.

Figure 4:
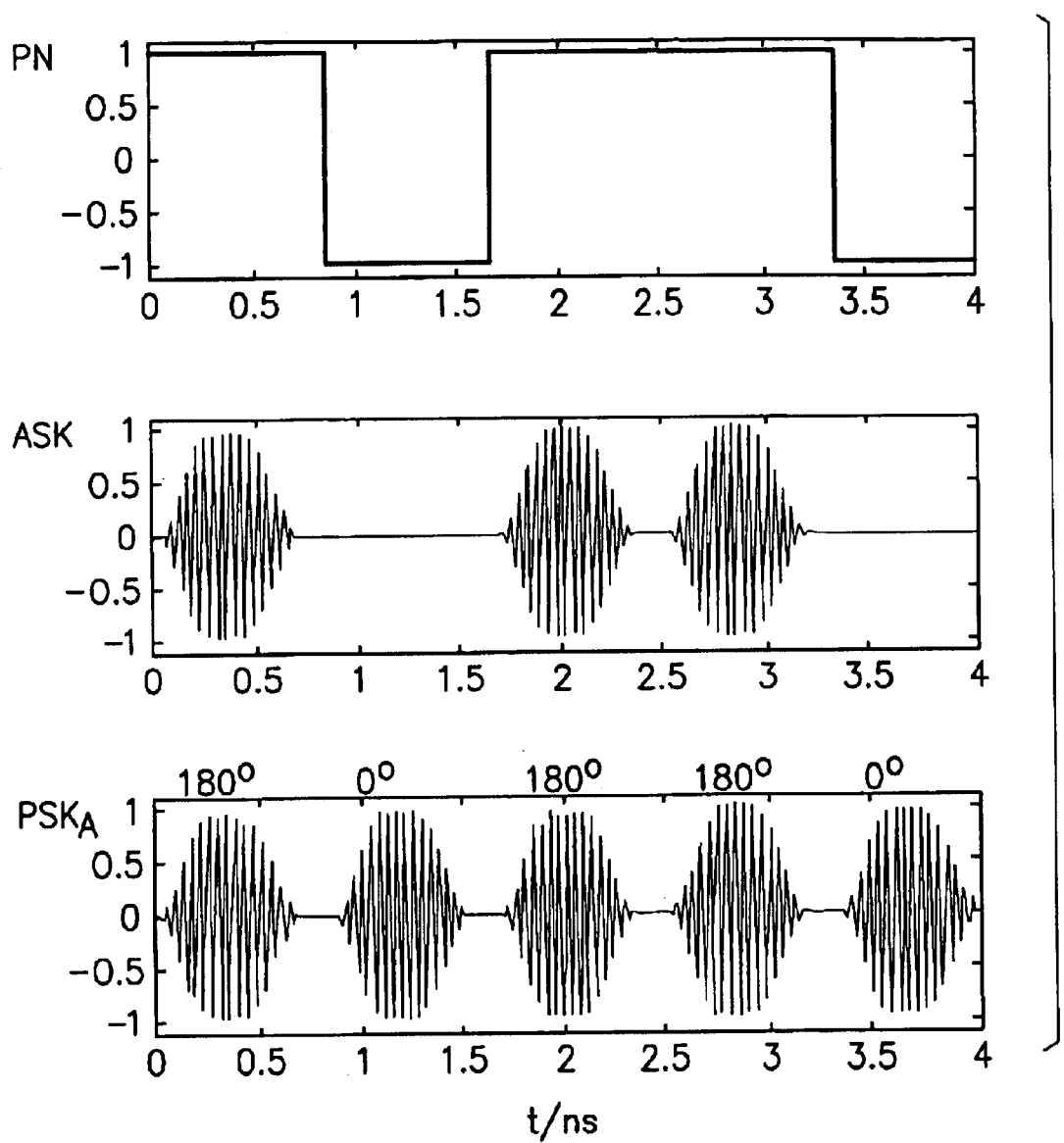
FIG. 4 shows segments of a PN code and of the signals modulated using the PN code.

FIG. 4 shows different principles of modulation of a carrier frequency. The transmitting signal of the radar sensor is created by modulation of the carrier frequency $f_0$ by a local oscillator (LO) with the corresponding PN code. Basically, various modulation types are available, for example, PSK, QPSK, ASK, FSK and MSK. The present invention relates to modulation types ASK and PSK as well as to a PSK modulation with blanking of phase transitions. The upper part of FIG. 4 shows a segment of an 8-bit PN code. The middle part shows a signal ASK amplitude-modulated with the PN code. The lower part shows a signal $PSK_A$ phase-modulated with the PN code, the phase transitions being blanked.

In the actual construction of the sensor, transition times are created between the on and off state of the signal in ASK and PSK modulation. In the modeling of the example shown in FIG. 4, these are taken into consideration at a duration of, for example, 100 ps for the transition between 0° and 180°. In PSK, the carrier frequency has to be an integer multiple of the pulse repetition rate or of the chip pulse frequency. In order to achieve an optimum interference signal suppression, as great as possible a value is obtained according to the integration of the autocorrelation function over one or more frames at $v=0$. In the case of code shiftings between $v=1$ and the maximum used code shifting $v_{inst}$, values as low as possible should appear. In this connection, a PSK modulation of carrier frequency $f_0$ is expedient. The phase relation of $f_0$ is shift keyed in a PSK modulation between 0° and 180°.

Since the transition of the phase relation does not instantaneously take place in the actual construction, errors occur after the integration of the signal. Thereby, the relationship $\delta$ of the amplitude at $v=0$ and the maximum amplitude at $v>1$ is reduced. If the PSK-modulated signal is blanked during the transition time between various phase relations, as shown at the bottom of FIG. 4, this error may be minimized.

Figure 5:
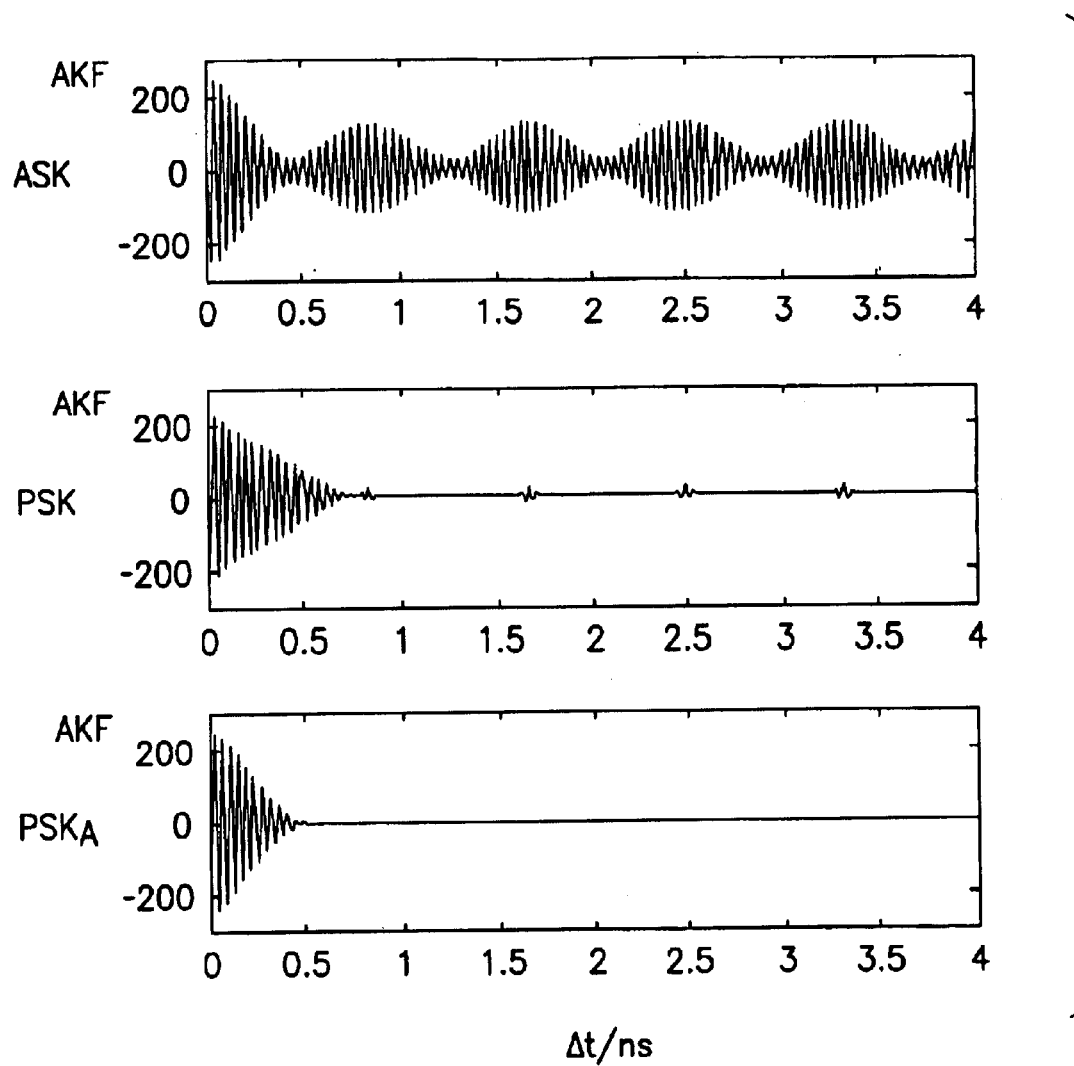
FIG. 5 shows autocorrelation functions of signals modulated in various ways.

FIG. 5 shows examples of autocorrelation functions for various scenarios. The upper part of FIG. 5 shows the autocorrelation function of the ASK-modulated signal. The middle part shows an autocorrelation function of the phase-modulated signal PSK, the phase transitions not being blanked. The lower part shows a phase modulation of signal $PSK_A$ having blanking of the phase transitions. In an ASK modulation, the result for the example shown in FIG. 5 is $\delta \approx 2$. In a PSK modulation without blanking of the phase transitions, the result is $\delta \approx 10$, and in a $PSK_A$ modulation with blanking of the phase transitions, the result is $\delta \approx 255$. Thus, a substantially better detection of the maximum, or rather a more effective interference signal suppression is achieved by the blanking.

By the combination of ASK and PSK, ASK being used in the transmit branch and PSK being used in the receive branch, or vice versa, $\delta$ theoretically tends to infinity. This means that the autocorrelation function for $v>1$ is zero. If there is an amplitude modulation ASK in the transmit branch and there is a phase modulation PSK in the receive branch, the average transmitting power is decreased by ca 3 dB. Because of the blanking of the phase transitions, the width of the maximum of the autocorrelation function goes down, or rather, the bandwidth of the amplitude spectrum is increased. This improves the separability of different targets at equal pulse frequency $f_{PW}$, a smaller increment, however, being required for the code shifting $\Delta v$. Alternatively, the pulse width $\tau$ may also be increased at almost unchanged high-sensitivity resolution, separability, increment and bandwidth.

Figure 6:
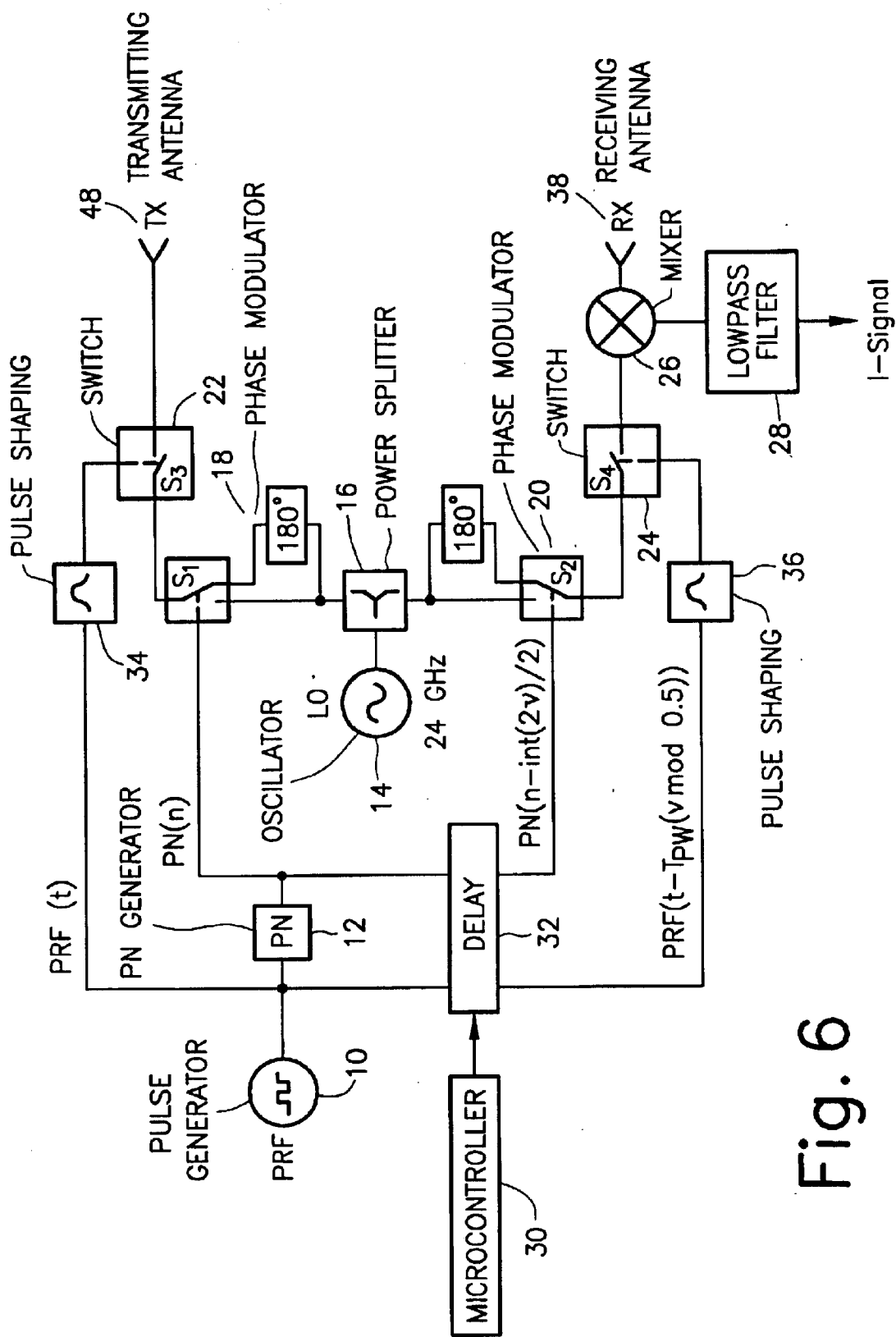
FIG. 6 shows a schematic representation of a specific embodiment of a radar system according to the present invention.

FIG. 6 shows a schematic representation of a specific embodiment of a radar system according to the present invention. The schematic representation is greatly simplified. In particular, only the in-phase(I) channel is shown, and the phase quadrature(Q) channel was omitted, the latter, however, being able to be formed identically, in principle. The radar system includes a timing pulse generator device 10 for generating pulse repetition rate PRF. The pulse repetition rate is supplied to a PN generator 12. A local oscillator 14 (LO) is also provided, which generates a carrier frequency $f_0$ of 24 GHz, for example. The carrier frequency is supplied by local oscillator 14 to a 3 dB power splitter 16. The power splitter supplies a transmit branch via a first phase modulator 18. Phase modulator 18 is here schematically shown as a switch. It may, for example, be implemented as a mixer. Power splitter 16 also supplies a receive branch, via a second phase modulator 20, which likewise may be implemented as a mixer. The outputs of phase modulators 18, 20 are respectively connected to switches 22, 24 for blanking the phase transitions. The output of switch 22 in the transmit branch delivers the transmitting signal. The output of switch 24 in the receive branch is connected to a mixer 26. The receiving signal is input into this mixer 26, in addition to the output signal of switch 24. The output of mixer 26 is connected to a lowpass filter 28, which delivers the in-phase(I) signal as output signal. A microcontroller or a digital signal processor 30 is also provided, which controls a delay 32. This delay is used for the delay as well as for the pulse repetition rate and also the PN code in the receive branch. While in the transmit branch the pulse repetition rate is passed directly to a pulse shaping 34, whose output signal switches the switch for blanking 22 of the phase transitions in the transmit branch, the pulse repetition rate in the receive branch is passed via delay 32 to a pulse shaping 36, which switches switch 24 for blanking the phase transitions in the receive branch. The PN code is also used directly for phase modulation in the transmit branch, in that it switches switch 18 for phase modulation. In the receive branch, the PN code is supplied delayed to switch 20 for phase modulation. The receive branch ends in a receiving antenna 38; the transmit branch ends in a transmitting antenna 48.

The radar system as in FIG. 6 works as follows: Local oscillator 14 generates a carrier frequency, which is supplied to the transmit branch via power splitter 16. A part of the power of the carrier frequency is fed to the receive branch as a reference signal. In the transmit branch, the carrier frequency is phase-modulated by phase modulator 18. The phase modulation is carried out by the PN code, which is generated by PN generator 12. The phase-modulated signal is supplied by phase modulator 18 to a switch 22 for blanking the phase transitions. This switch is operated by an output signal of pulse shaping 34, which generates a time window for the blanking as a function of pulse repetition rate 10. Pulse repetition rate 10 is thus responsible for the undelayed fixing of a time window for pulse shaping 34 as well as for the undelayed availability of the PN code for phase modulation 18. In the receive branch, the output signal of power splitter 16 is also phase modulated in phase modulator 20. The output signal of phase modulator 20 is supplied to switch 24 for blanking, switch 24 being operated by the output signal of pulse shaping 36. This pulse shaping 36 is controlled by the pulse repetition rate in a delayed manner. Phase modulator 20 is also controlled by a delayed PN code.

Basically, the sequence of phase switches 18, 20 and the respective switches 22, 24 for blanking is a matter of choice. Blanking may also occur between receiving antenna 38 and mixer 26 or between mixer 26 and lowpass filter 28. The phase modulation may also be located between receiving antenna 38 and mixer 26.

Figure 7:
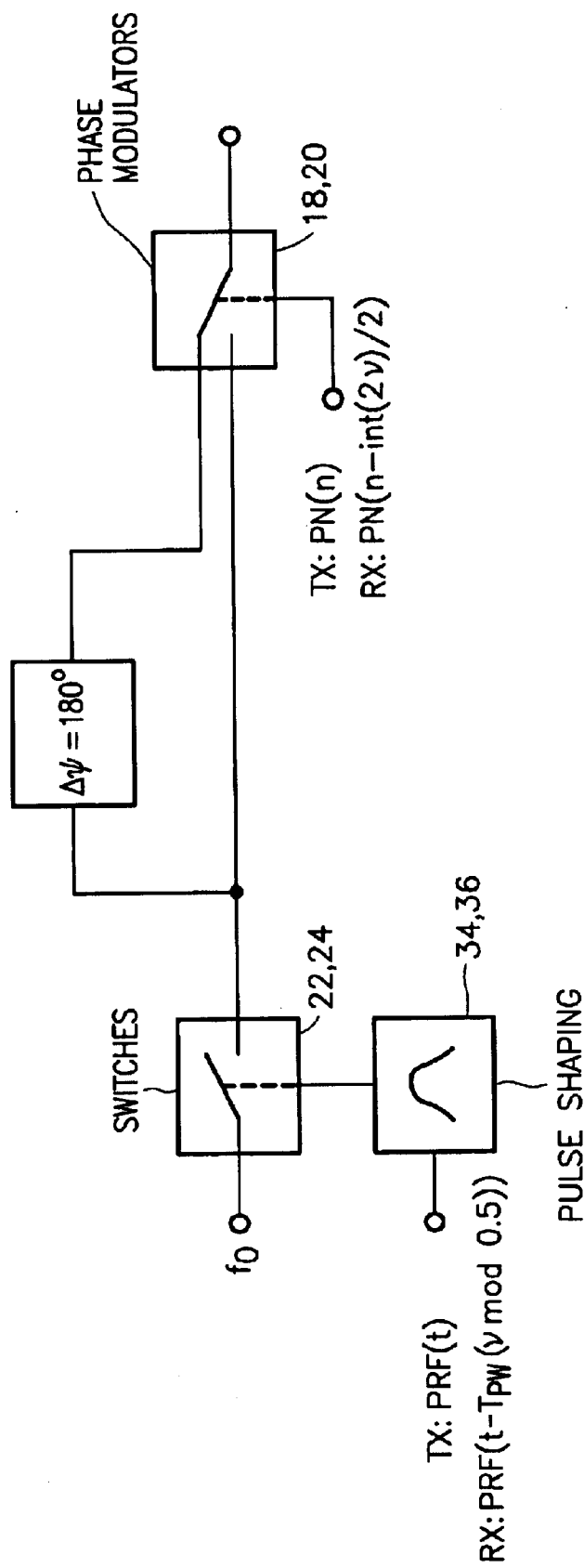
FIG. 7 shows a schematic representation of a PSK circuit having blanking of phase transitions.

The relationships with respect to code shifting in the receive branch are explained in greater detail with the aid of FIG. 7. In transmit branch (TX), pulse shaping takes place using the pulse repetition rate at point in time t PRF(t). The switching of the phase relation takes place in the transmit branch using non-shifted PN code PN(n). In receive branch (RX) the pulse shaping takes place using delayed pulse repetition rate PRF(t−$T_{PW}$(v mod0.5)). The switching of the phase relation takes place in the receive branch using a delayed PN code PN(n−int(2v)/2). Code shifting v in receive branch (RX) is subdivided by this circuitry into half-integer component (int(2v)/2=0; 0.5; 1; 1.5; . . . ) and the rest (vmod(0.5)) is subdivided by modulo division of v using ½.

Figure 8:
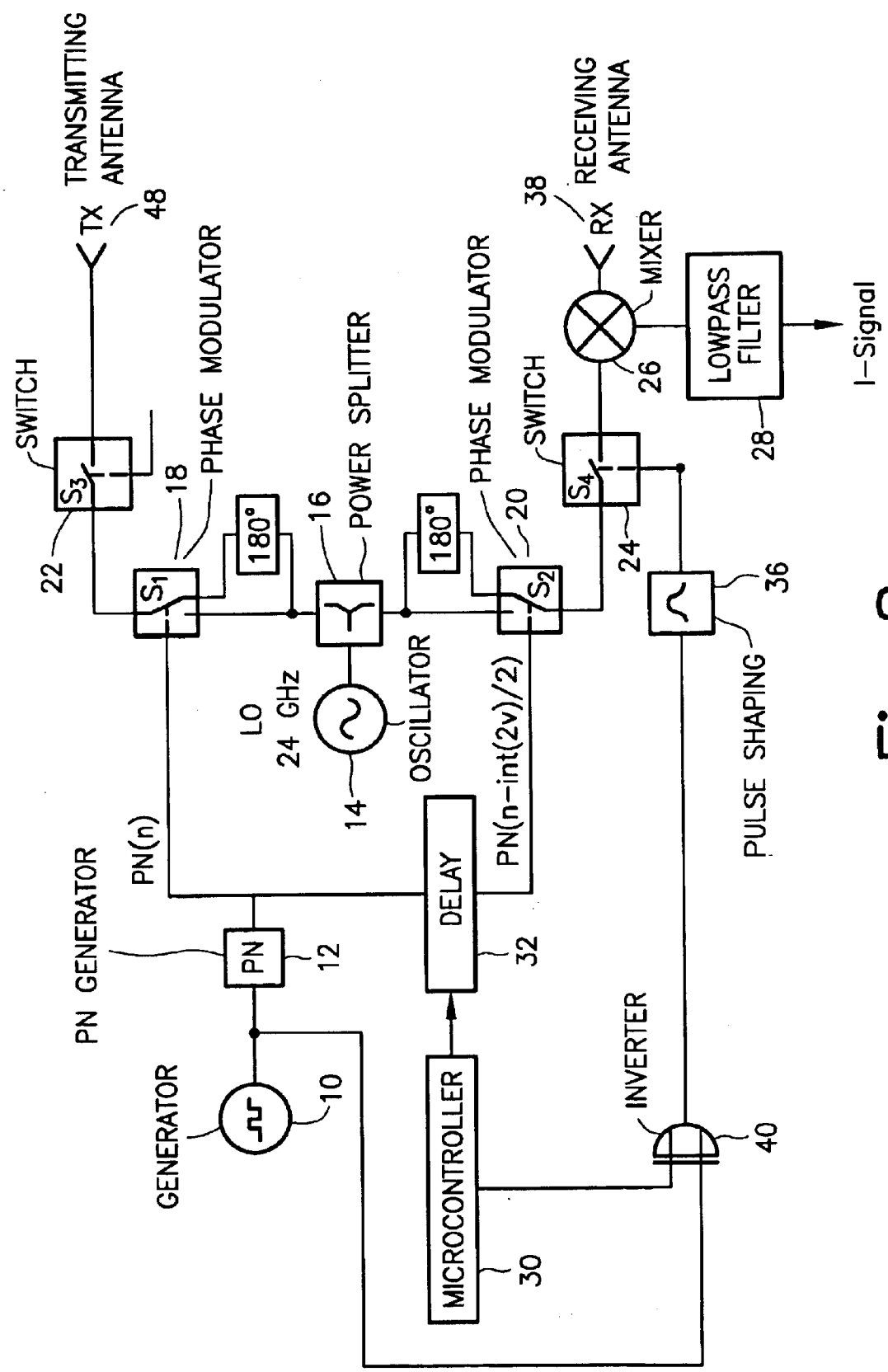
FIG. 8 shows a schematic representation of a further specific embodiment of a radar system according to the present invention.

A simplified system is possible for a chip pulse frequency $f_{PW}$ which is greater than or equal to the reciprocal value of pulse width $\tau(f_{PW} \geq f_{PW,0} \approx 1/\tau)$. Such a system is shown in FIG. 8.

Components corresponding to those in FIG. 6 are shown in the other figures using the same reference symbols. The blanking for the receive branch has still only to be switched between v=0 and v=½, which is equivalent to an inversion 40.

Figure 9:
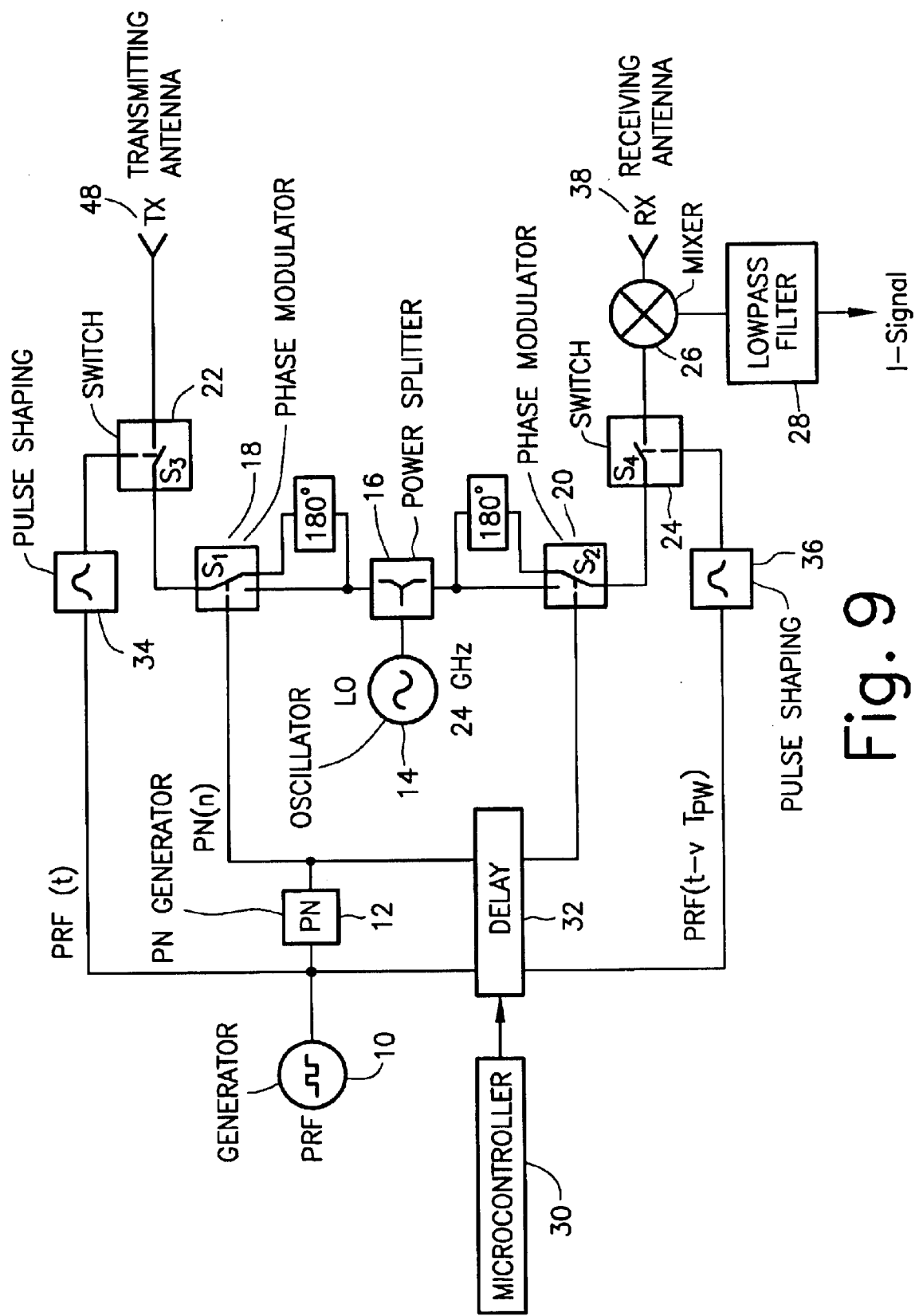
FIG. 9 shows a schematic representation of a further specific embodiment of a radar system according to the present invention.

An additional simplification is represented in FIG. 9. This arrangement shows a radar system corresponding to FIG. 6, the special case $f_{PW} \leq f_{PW,u}$ being shown, where $$f_{PW,u} \leq \frac{c}{2R_{inst}}$$

In this case, the half-integer shifting of the PN code is also left out. If one uses a different code whose autocorrelation function has a "peak" with greater width, then $f_{PW,0}$, $f_{PW,u}$ and $\Delta v_{max}$ increase correspondingly.

Figure 10:
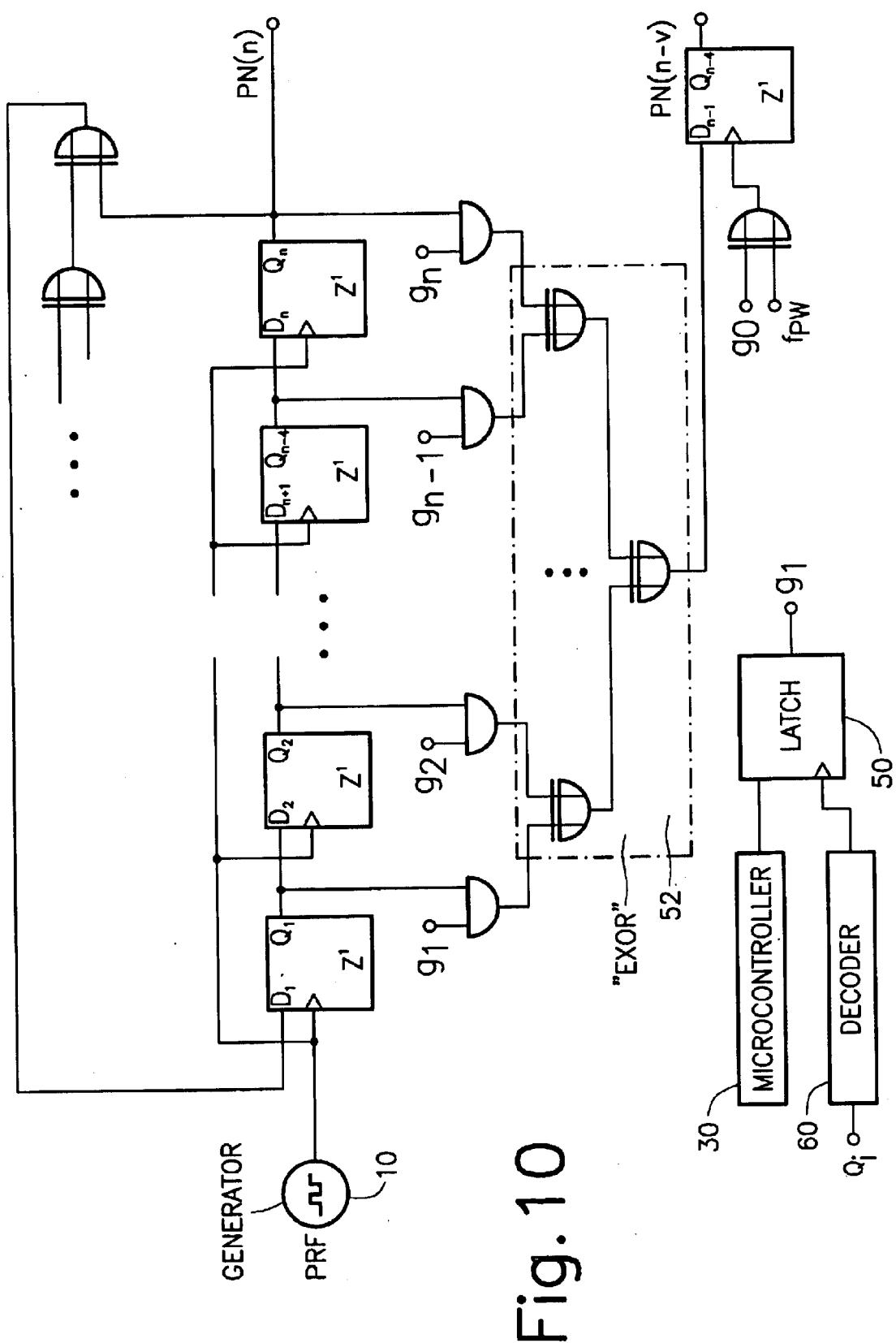
FIG. 10 shows a schematic representation of a device for generating and shifting a PN code.

A possible embodiment of the circuit for generating the desired PN sequence and the PN sequence respectively shifted to it is shown schematically in FIG. 10. The PN coder is implemented with the aid of an n-bit shift register, whose outputs $Q_i$ are connected to inputs $D_i$ via suitable EXOR linkages, and represents an n-bit counter having a special counting sequence.

At each output $Q_i$ one obtains the same PN code having in each case different temporal delays. An integer code shifting is effected by allocating "0" or "1" to the weightings ($g_1, g_2, \ldots, g_n$). Using $g_0=1$, one achieves an additional shifting by $\Delta v=½$ by inverting the output pulse. The actual code shifting is carried out by the EXOR linkages 52 between outputs $Q_i$. These may be described as parity checks (uneven parity "1"; even parity "0"). The allocation of the weights $g_i$ is computed either with the aid of the digital signal processor or of microcontroller 30, or it is generated by a additional fitting PN shift register.

For an interference signal suppression that is as great as possible, the switching of the code shifting is carried out each time at the same allocation of Qi, and the counter content of the PN coder is decoded 60. At each frame run-through, a transition pulse (pulse input at latch 50) is generated for the code shifting set by the digital signal processor. The weights $g_i$ are thus updated after each frame run-through of the PN code.

Figure 11:
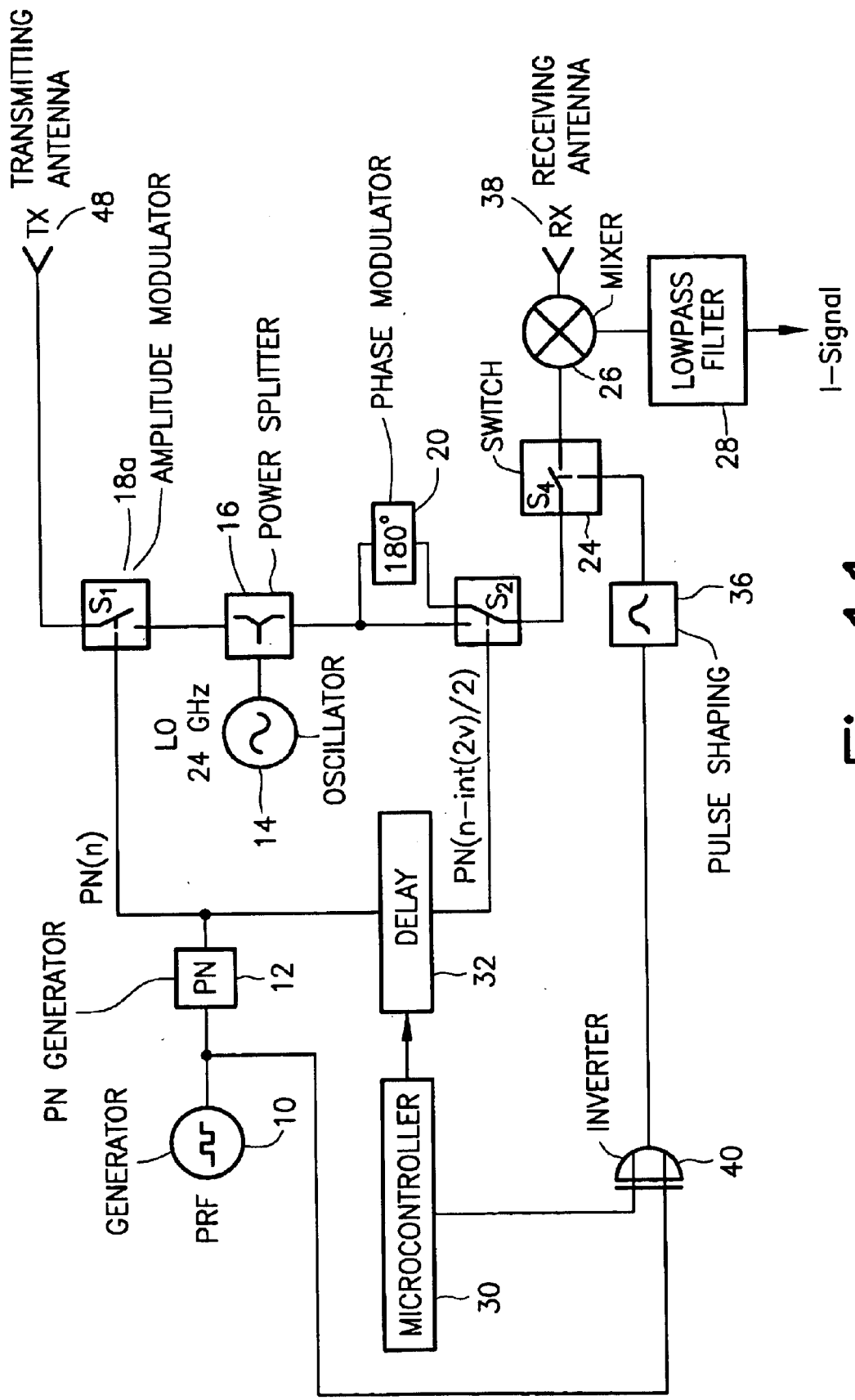
FIG. 11 shows a schematic representation of a further specific embodiment of a radar system according to the present invention.

FIG. 11 shows a further schematic representation of a specific embodiment of a radar system according to the present invention, here an amplitude modulation ASK 18a being combined with a phase modulation PSK 20. In turn, the special case $f_{PW} \geq f_{PW,o}$ is shown, i.e. an inverting 40 is sufficient for the blanking of the phase transitions. The present combination of ASK and PSK is also possible for the embodiments corresponding to FIGS. 6 and 9. If PSK is used in the transmit branch and ASK in the receive branch, the average transmitting power is increased by ca 3 dB at equal S/N ratio.

The method used (pure PSK or a combination of PSK and ASK) may be broadened for the evaluation of signals transmitted by other radar sensors and modulated in each case by another code $Pn_i$.

Figure 12:
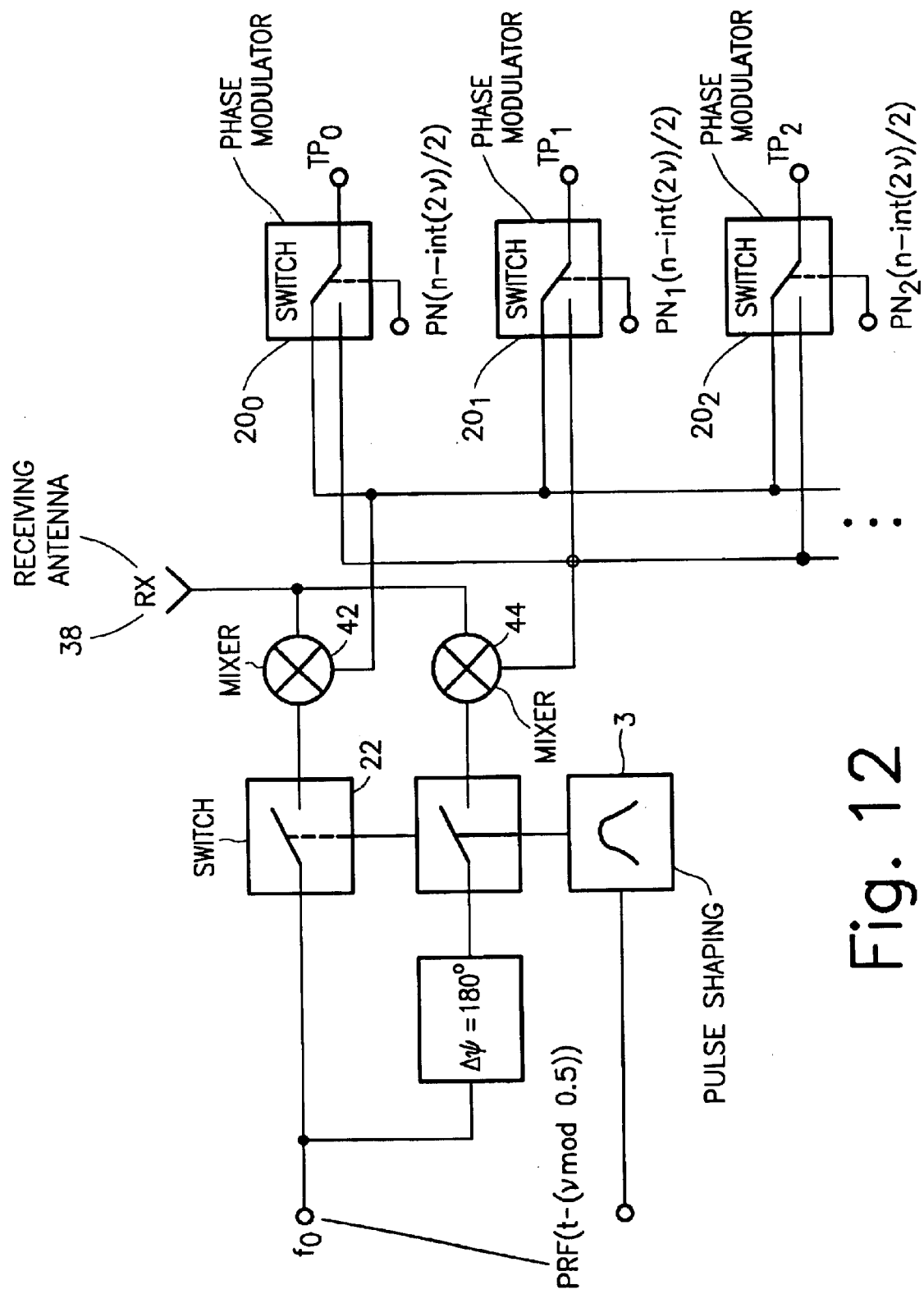
FIG. 12 shows a schematic representation of a circuit for evaluating the transmission signals of several radar sensors.

In FIG. 12 an example is shown in which an evaluation of the transmitting signal from several radar sensors using PSK in the receive branch takes place. This works with two mixers 42, 44, each mixer being responsible for mixing the receiving signals with one of the participating phases. The outputs of mixers 42, 44 are supplied respectively to phase modulators $20_0$, $20_1$, $20_2$, where a transition of the phase relations takes place. In this case, pulse shaping 36 takes place before mixers 42, 44. The output signals of switches $20_0$, $20_1$, $20_2$ for switching over phase relation are supplied to lowpass filters $TP_0$, $TP_1$, $TP_2$, which are not shown. Interference of the various channels by one another is avoided in that the signals of adjacent sensors are coded with different PN codes $PN_1$ or $PN_2$. In FIG. 12 only three channels are shown, however, the system may be expanded to a larger number of channels. Likewise, only the generation of the I signals is shown, the Q signals being maintained analogously to an $f_0$ phase-shifted by 90°.

Figure 13:
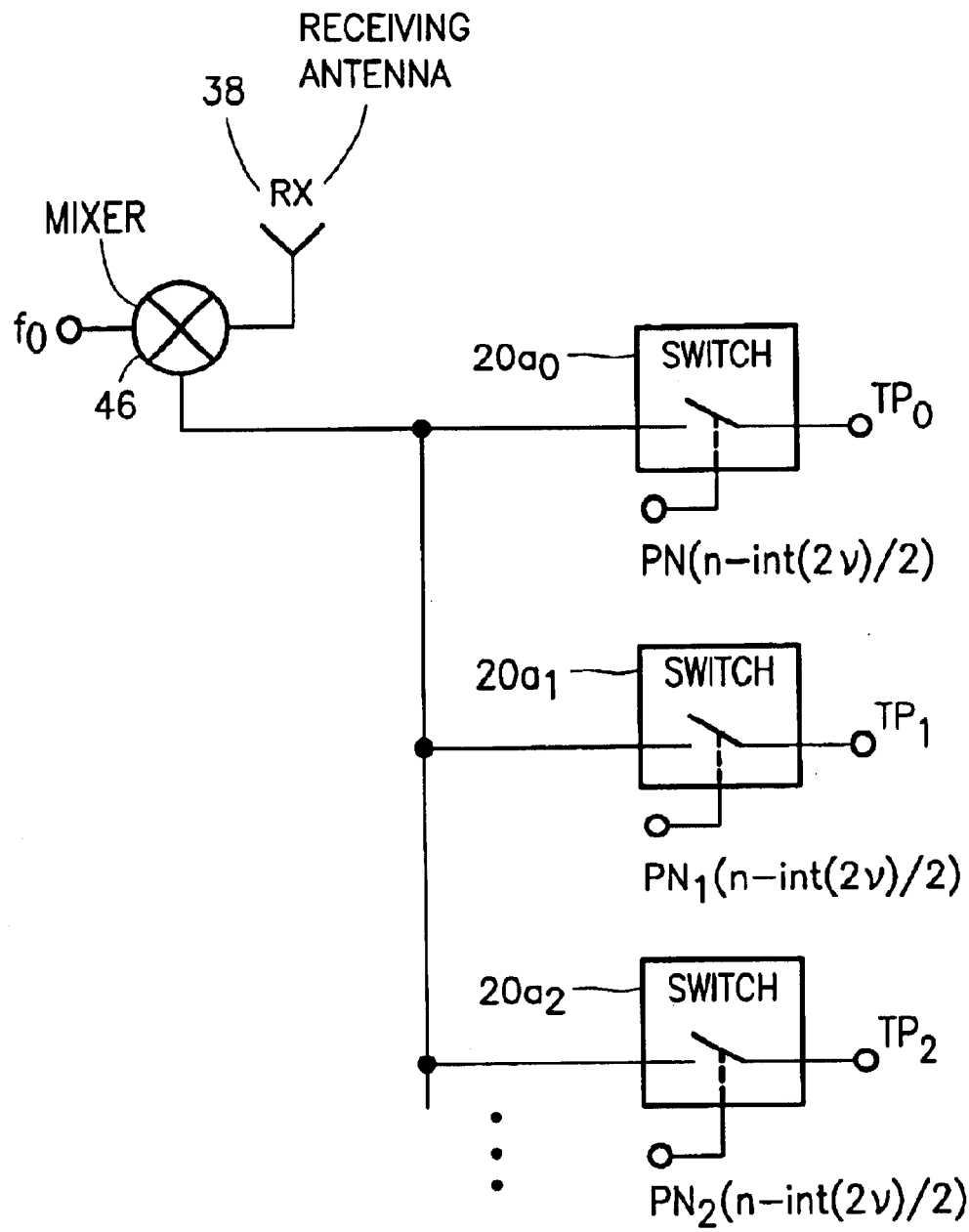
FIG. 13 shows a schematic representation of a further circuit for evaluating the transmission signals of several radar sensors.

Comparably to FIG. 12, FIG. 13 shows a block diagram for the implementation of the evaluation of the transmitting signals of several sensors, using, however, ASK in the receive branch. Mixer 46 mixes the carrier frequency $f_0$ with the receiving signal, and outputs the mixed signal to switches $20a_0$, $20a_1$ and $20a_2$ for amplitude modulation. There, an amplitude modulation is carried out by the different PN codes PN, $PN_1$ and $PN_2$. Since the receive branch is involved here, a delayed PN code is used. The output signals of switches $20a_0$, $20a_1$ and $20a_2$ are passed on to lowpass filters $TP_0$, $TP_1$ and $TP_2$. Likewise, only the generation of the I signals is shown, the Q signals being maintained analogously to an $f_0$ phase-shifted by 90°. In turn, this circuit, too, may be expanded to a greater number of channels.

Figure 14:
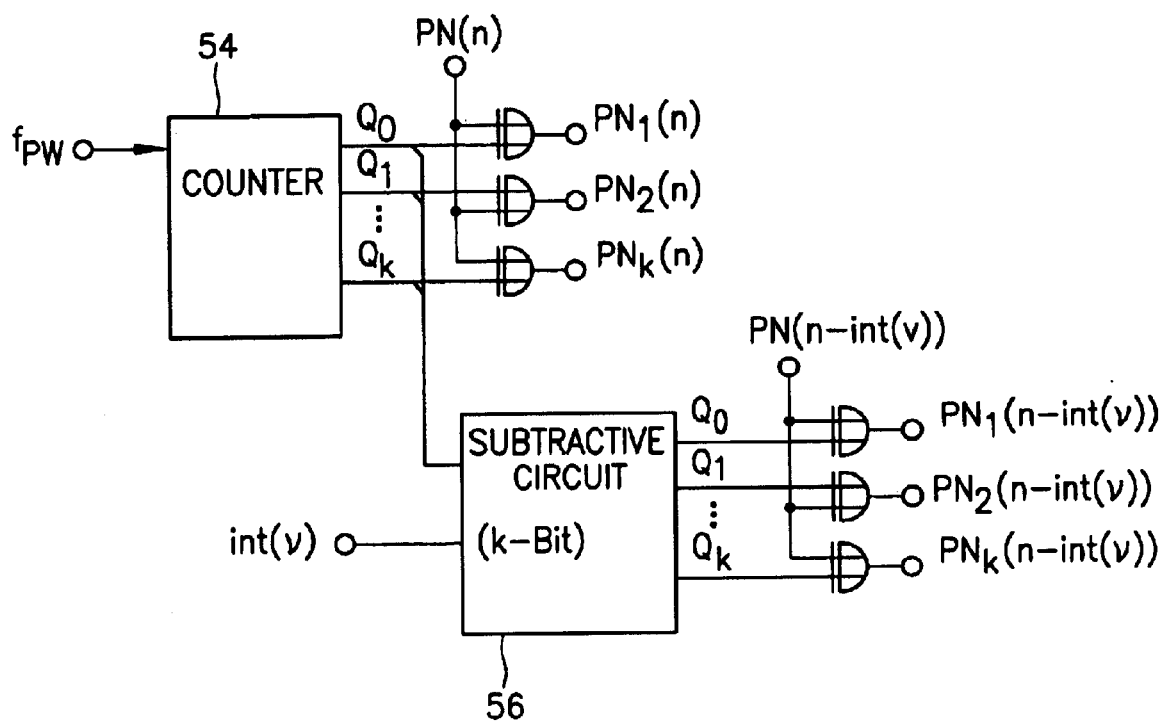
FIG. 14 shows a schematic representation for generating derived PN codes.

FIG. 14 shows a circuit principle for generating derived codes having an ideal crosscorrelation function (KKF) and having codes each delayed by v whole pulses, a counter 54 and subtractive circuit 56 being provided.

An ideal decoupling (AKF=0) for a smaller number of radar sensors is obtained by cyclical inverting of the individual chips (FIG. 14), or of chip groups from an output code PN(n). For the derivation of the first code $PN_1(n)$, the following applies:

$$PN_1(n) = (-1)^n PN(n); n=0, 1, \ldots, 2N-1$$

In general, for all codes $PN_i(n)$ derived from PN(n) one may write:

$$PN_i(n) = (-1)^{\text{round-off} \frac{n}{2^{i-1}}} PN(n); n = 0, 1, \ldots, 2^i N - 1.$$

These codes are particularly suitable for the use of several radar sensors in a Motor vehicle. They have the effect of decreased interference of the sensors among themselves. At each derivation i the frame length of the new code doubles, and then its value is $2^i N$. Since the individual chips have to be integrated over at least one frame length, the upper frequency limit of the lowpass filter used for the integration should then be lowered in each case by a factor of $2^i$. FIG. 14 shows the part of the circuit for generating the derived codes.

Figure 15:
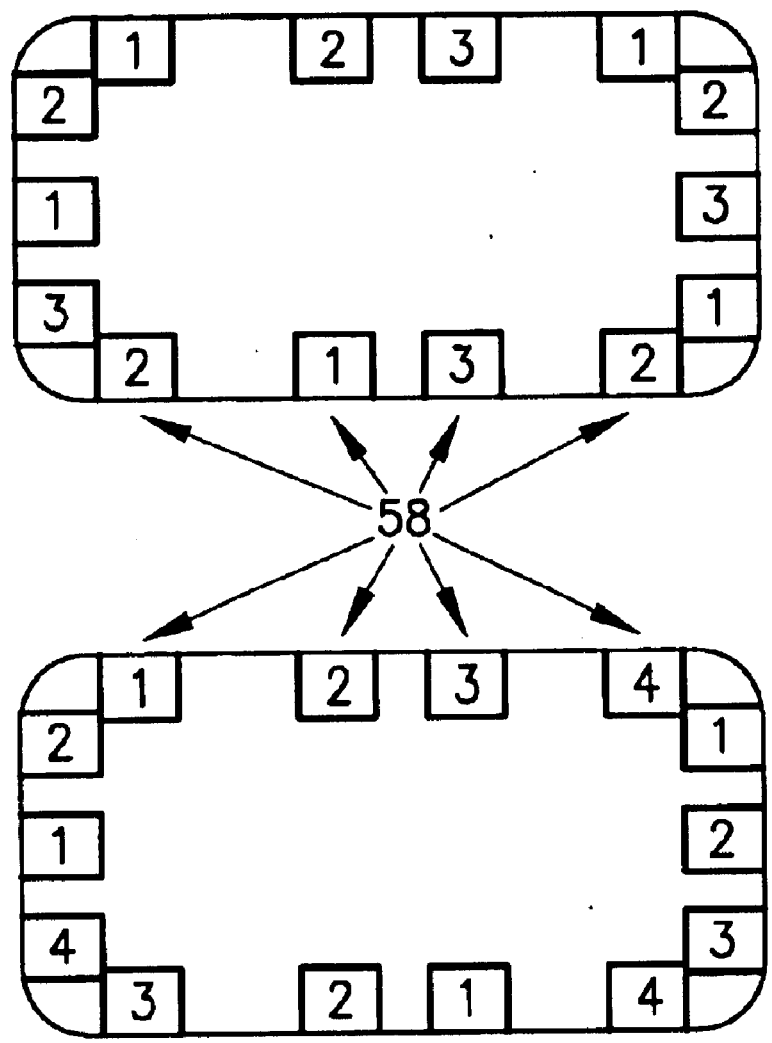
FIG. 15 allocations of sensors in a motor vehicle having various codes.

FIG. 15 shows an exemplary assignment of sensors 58 in a motor vehicle in the case of three (above) and four (below) of various codes. If code pairs having a suitable crosscorrelation function (KKF is as small as possible) are selected, then it is possible to decouple various radar sensors (e.g. of different motor vehicles) from one another. A lower susceptibility to interference among various PN-coded radar sensors 58 is achieved.

Besides the PN codes, other binary codes, such as gold codes, quadratic residue sequences, pseudo-random sequences and complementary sequences or even ternary codes, etc, having similar properties are known.

The preceding description of the exemplary embodiments according to the present invention is for illustrative purposes only, and is not meant to restrict the present invention. Various changes and modifications are possible within the framework of the present invention, without leaving the scope of the present invention and its equivalents.

What is claimed is:

1. A radar system, comprising:
an arrangement for generating a code;
an arrangement for modulating a transmitting signal in a transmit branch using the code;
an arrangement for delaying the code;
an arrangement for modulating a signal in a receive branch using the delayed code;
an arrangement for mixing a reference signal with a receiving signal;
an arrangement for modulating one of the transmitting signal, the signal in the receive branch, the reference signal, and the receiving signal by an amplitude modulation;
an arrangement for modulating another one of the transmitting signal, the signal in the receive branch, the reference signal, and the receiving signal by a phase modulation; and
an arrangement for blanking phase transitions.

2. A radar system, comprising:
an arrangement for generating a code;
an arrangement for modulating a transmitting signal in a transmit branch using the code;
an arrangement for delaying the code;
an arrangement for modulating a signal in a receive branch using the delayed code;
an arrangement for mixing a reference signal with a receiving signal;
an arrangement for modulating one of the transmitting signal, the signal in the receive branch, the reference signal, and the receiving signal by a phase modulation; and
an arrangement for blanking phase transitions.

3. The radar system as recited in claim 2, wherein:
the arrangement for blanking the phase transitions includes an arrangement for pulse shaping and a switch connected in series to the arrangement for modulating.

4. The radar system as recited in claim 2, wherein:
the code is a pseudo-noise code.

5. The radar system as recited in claim 1, wherein:
the modulation of the transmitting signal is carried out by the amplitude modulation, and
the modulation of the signal in the receive branch is carried out by the phase modulation.

6. The radar system as recited in claim 1, wherein:
the modulation of the transmitting signal is carried out by the phase modulation, and
the modulation of the signal in the receive branch is carried out by the amplitude modulation.

7. The radar system as recited in claim 1, wherein:
the arrangement for mixing the reference signal with the receiving signal emits an output signal to a lowpass filter.

8. The radar system as recited in claim 1, wherein:
the arrangement for delaying the code includes a digital arrangement for controlling the delaying.

9. The radar system as recited in claim 1, wherein:
the arrangement for delaying the code includes a circuit arrangement for controlling the delaying.

10. The radar system as recited in claim 1, wherein:

the code is an n-bit pseudo-noise (PN) code, and the arrangement for generating and the arrangement for delaying include n-bit counters having combinatorial linkage of counter outputs.

11. The radar system as recited in claim 1, wherein:

the receive branch is subdivided into a plurality of channels that use a plurality of PN codes for modulating, and a plurality of lowpass filters is provided for a further processing of one of the transmitting signal, the signal in the receive branch, the reference signal, and the receiving signal.

12. A method for coding a radar system, comprising:

generating a code;

modulating a transmitting signal in a transmit branch using the code;

delaying the code according to a delay;

modulating a signal in a receive branch using the delayed code;

mixing a reference signal with a receiving signal to produce a mixed signal;

modulating one of the transmitting signal, the signal in the receive branch, the reference signal, and the receiving signal by an amplitude modulation;

modulating another one of the transmitting signal, the signal in the receive branch, the reference signal, and the receiving signal by a phase modulation; and blanking phase transitions.

13. A method for coding a radar system, comprising:

generating a code;

modulating a transmitting signal in a transmit branch using the code;

delaying the code according to a delay;

modulating a signal in a receive branch using the delayed code;

mixing a reference signal with a receiving signal to produce a mixed signal;

modulating one of the transmitting signal, the signal in the receive branch, the reference signal, and the receiving signal by a phase modulation; and blanking phase transitions.

14. The method as recited in claim 13, wherein the code is a pseudo-noise code (PN code).

15. The method as recited in claim 12, wherein:

the modulation of the transmission signal is carried out by the amplitude modulation, and the modulation of the signal in the receive branch is carried out by the phase modulation.

16. The method as recited in claim 12, wherein:

the modulation of the transmission signal is carried out by the phase modulation, and the modulation of the signal in the receive branch is carried out by the amplitude modulation.

17. The method as recited in claim 12, wherein:

the mixed signal is emitted to a lowpass filter.

18. The method as recited in claim 12, wherein:

the delay is controlled digitally.

19. The method as recited in claim 12, wherein:

the delay is controlled by a circuitry arrangement.

20. The method as recited in claim 12, wherein:

the code is an n-bit PN code, and the n-bit PN code is generated and delayed by an n-bit counter having combinatorial linkage of counter outputs.

21. The method as recited in claim 12, wherein:

the receive branch is subdivided into a plurality of channels that use a plurality of PN codes for modulating, and after one of the transmitting signal, the signal in the receive branch, the reference signal, and the receiving signal is modulated to produce a modulated signal, the modulated signal is processed further by a plurality of lowpass filters.

* * * * *